United States Patent [19]

Shaull

[11] Patent Number: 4,896,851
[45] Date of Patent: Jan. 30, 1990

[54] MOUNTING ATTACHMENT FOR STRUCTURAL STRINGERS

[75] Inventor: Lawrence M. Shaull, Renton, Wash.

[73] Assignee: The Boeing Company, Seattle, Wash.

[21] Appl. No.: 205,080

[22] Filed: Jun. 10, 1988

[51] Int. Cl.⁴ .............................................. F16L 3/24
[52] U.S. Cl. ..................................... 248/72; 248/228
[58] Field of Search ............... 248/72, 73, 74.3, 205.1, 248/205.2, 223.3, 225.31, 228, 231.4, 231.6, 309.1, 499, 505; 24/306, 442; 410/101, 104, 116; 403/405.1

[56] References Cited

U.S. PATENT DOCUMENTS

| | | | |
|---|---|---|---|
| 2,517,927 | 8/1950 | Reed | 248/231.4 |
| 2,529,686 | 11/1950 | Green | 248/231.4 |
| 2,563,698 | 8/1951 | Whitebread | 248/499 |
| 2,595,352 | 5/1952 | Graham | 248/228 |
| 2,697,572 | 12/1954 | Pfankuch | 248/231.4 |
| 2,915,268 | 12/1959 | Wrobel | 248/74 |
| 3,140,848 | 7/1964 | Sherburne | 248/72 |
| 3,292,888 | 12/1966 | Fischer | 248/228 |
| 3,302,913 | 2/1967 | Collyer et al. | 248/73 |
| 3,313,511 | 4/1967 | Koerner | 248/499 |
| 3,469,810 | 9/1969 | Dorris | 248/228 |
| 3,913,876 | 10/1975 | McSherry | 248/74 |
| 3,994,048 | 11/1976 | Rosenthal | 24/81 |
| 4,088,136 | 5/1978 | Hasslinger et al. | 128/349 |
| 4,094,021 | 6/1978 | Rapp | 24/306 |
| 4,096,863 | 6/1978 | Kaplan et al. | 128/349 |
| 4,235,404 | 11/1980 | Kraus | 248/74 |
| 4,353,519 | 10/1982 | Bogart | 248/72 |
| 4,358,081 | 11/1982 | Notoya | 248/73 |
| 4,735,387 | 4/1988 | Hirano | 248/74.3 |
| 4,759,963 | 7/1988 | Uso, Jr. | 248/205.2 |

Primary Examiner—Blair M. Johnson
Assistant Examiner—Robert A. Olson
Attorney, Agent, or Firm—Glenn D. Bellamy

[57] ABSTRACT

A support attachment for structural stringers includes a strap having a hook portion at one end shaped to engage an edge of a stringer and a normally free end. The strap's surface has a plurality of upstanding engaging elements extending substantially along its entire length. Also included is a body having a hook portion shaped to engage another edge of a stringer. The body has a central portion and a pair of parallel spaced-apart guide-wall portions which extend outwardly away from one side of the central portion to form a guide channel. A surface portion of the body, having a plurality of mating upstanding engaging elements, extends outwardly away from the opposite side of the central portion. A guide avenue through the central portion provides a pathway for guiding the strap's free end from between the guide-wall portions to the surface portion. Respective hook portions of the strap and body may engage opposite edges of a stringer and may be secured thereto by passing the free end of the strap through the guide avenue and drawing the respective engaging elements into engaging juxtaposition while the strap is in tension. A supporting means on the central portion allows other devices or members to be attached thereto and, thus, supported on the stringer.

7 Claims, 1 Drawing Sheet

U.S. Patent  Jan. 30, 1990  4,896,851
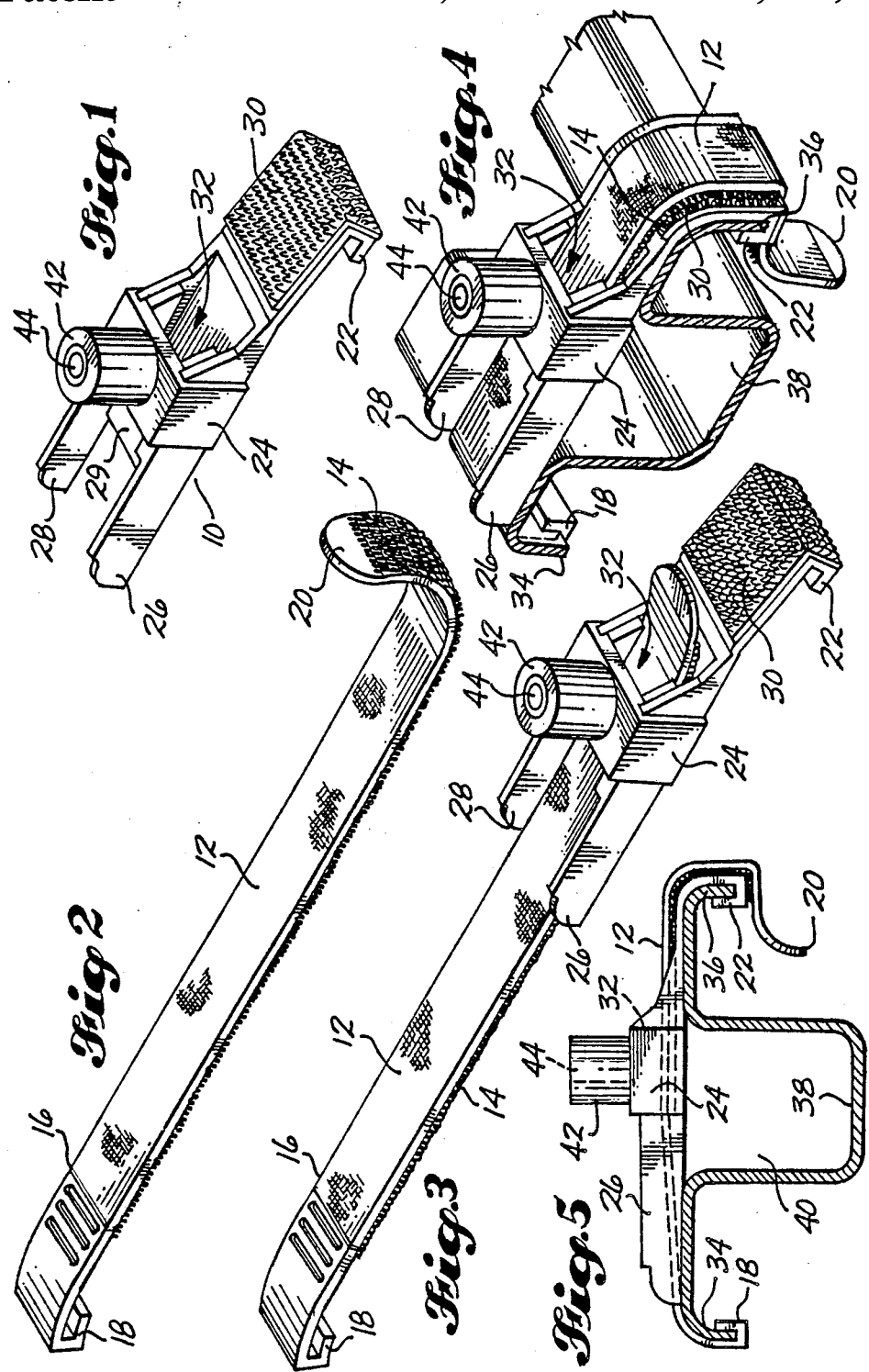

MOUNTING ATTACHMENT FOR STRUCTURAL STRINGERS

TECHNICAL FIELD

The present invention relates to mounting members attachable to aircraft structural stringers, and to which articles, e.g. wire bundles, are attached. More particularly, the invention relates to the provision of an improved connector structure for connecting a support member to a stringer.

BACKGROUND ART

U.S. Pat. No. 4,353,519, granted October 12, 1982, to Patrick M. Bogart, and assigned to The Boeing Company, discloses two different ways of securing a mounting member to a stringer, each of which employs a pair of hooks engageable on flange portions of the stringers and a mechanism between the hooks which is operable to draw the hooks into tight clamping engagement with the flanges.

In these prior art attachments, a ratchet-type clamping mechanism is used. In order to move or adjust these prior art attachments, it is necessary to pry a ratchet pawl from its engaged position. Prying on the pawl may cause it to crack and break, thereby causing the attachment member to be unusable and creating undesirable waste.

U.S. Pat. No. 3,913,876, granted October 21, 1975, to William E. McSherry, discloses another type of mounting attachment. This attachment member is secured by fasteners inserted through mounting holes or by pressure-sensitive adhesive. Because drilling through the flanges of a stringer may affect structural stress performance, attachment by this method is not acceptable. The use of an adhesive requires that the securing means be destroyed when the attachment member is removed for repositioning.

The principal object of the present invention is to provide a mounting member of this general type which is inexpensive to manufacture, easy to use, and which is stronger and more durable than the prior art devices.

DISCLOSURE OF THE INVENTION

Provided is a mounting member securable to an aircraft structural stringer and to which may be secured other attaching devices or members. The mounting member comprises two components. The first component is a strap having a hook portion at one end shaped to engage an edge of a stringer and a normally free end. A surface of the strap includes a plurality of engaging elements upstanding therefrom substantially along the entire length of the strap. The second component is a body which includes a hook portion shaped to engage another edge of the stringer and a plurality of engaging elements upstanding therefrom adjacent the hook portion. The strap's hook and the body's hook are moved into engagement with respective opposite edges of the stringer. The strap's free end is pulled upon to tension the strap. The strap is then moved to bring the engaging elements on the strap into engaging juxtaposition with the engaging elements on the body, to secure the strap to the body and to secure the support attachment to the stringer. This allows attachment of other devices to the body and, in turn, supports such devices or members on the stringer.

It is a principal object of the invention to provide a support attachment capable of securing objects firmly to a structural stringer, but which is removable or repositionable without damage or destruction thereof. Preferably, the upstanding mating engaging elements are constructed of VELCRO ® brand separable fastener tape materials suitably secured to the other members to provide the desired arrangement. The strap may comprise a length of separable fastener tape woven or knitted of a synthetic heat-deformable material such as nylon, polyester and the like, including resilient engaging elements upstanding from a base fabric. The strap of fastener tape could be secured at one end to the hook member by integrally molding it therein or by sewing, welding, or gluing thereto. The mating engageable elements of the body surface should be made of a complementary material attached to the body or integrally formed therein. In preferred form, the mating engageable elements of the body surface may be formed onto a fabric substrate and then such substrate encapsulated in molten thermoplastic material from which the body is molded.

In the present embodiment, the engaging elements are constructed in the form of hook-type hooking elements which mate with loop-type hooking elements on their opposed engaging surface portions. However, it should be understood that any flexible engaging elements which are readily securable in face-to-face relation, and which particularly resist separation by forces parallel to the interfacial plane of engagement, but are easily separated by a peeling action, are contemplated within the scope of the present invention.

Further objects and advantages of the invention may be apparent from the following description and drawing which have been set out in detail for the purpose of complete disclosure, without intending to limit the scope of the invention which is set forth in the appended claim.

BRIEF DESCRIPTION OF THE DRAWING

In the drawings which accompany the description of the invention presented herein, like reference numerals refer to like parts throughout the various views, and wherein:

FIG. 1 is a pictorial view of a preferred embodiment of the body component of the present invention;

FIG. 2 is a pictorial view of a preferred embodiment of the strap component of the invention;

FIG. 3 is a pictorial view of a preferred embodiment of the invention showing the strap partially inserted through the transverse opening in the central portion of the body;

FIG. 4 is a pictorial view of a preferred embodiment of the invention attached to a portion of an aircraft structural stringer; and .

FIG. 5 is a side view of a preferred embodiment of the invention attached to an aircraft structural stringer shown in cross-section.

BEST MODE FOR CARRYING OUT THE INVENTION

Referring now to the drawing, and first to FIG. 1, therein is shown a preferred embodiment of the body 10 of a support attachment. Shown in FIG. 2 is a preferred embodiment of the strap 12 of a support attachment. One surface 14 of the strap 12 consists of a multiplicity of small loops made of filamentary material, the material being stiff enough so that the loops project outwardly from the face of the strap 12. The loops may be woven or knitted onto the surface of a fabric substrate, which together form the strap 12. At a first end 16 of the strap 12 is a hook member 18. The hook member 18 is shaped to engage an edge of an aircraft structural stringer. In preferred form, the hook member 18 is molded of a thermoplastic material and the first end 16 of the strap 12 is integrally molded or encapsulated therein. The second end 20 of the strap 12 is a normally free end.

The body 10 includes a hook member 22 which is also shaped to engage an edge of a stringer. Extending outwardly from a central portion 24 of the body 10 are a pair of substantially parallel spaced-apart guidewall portions 26, 28. Extending outwardly from the opposite side of the central portion 24 is a surface portion 30 which includes a multiplicity of upstanding filamentary hook elements. In preferred form, the surface portion 30 is the outward surface of the hook member 22. The upstanding filamentary hook elements may be formed onto a fabric substrate and then attached to the surface portion 30 by adhesively attaching the fabric substrate thereto or by encapsulating the fabric substrate in molten thermoplastic material as the body 10 is formed.

The hook elements of the surface 30 are engageable with the loop elements of the strap surface 14. Preferably, the interengaging elements are those incorporated in fastening tapes sold commercially under the trademark VELCRO ® by Velcro Corp., New York, New York. The hook element of the body surface 30 may be woven or knitted onto a fabric substrate and then attached to the body 10 or may be integrally formed therein. It is to be appreciated that the hook elements and loop elements may be interchanged, so long as respective surfaces 14, 30 bear complementary engaging elements.

A transverse opening 32 is formed through the central portion 24 of the body 10. The opening 32 is sized to allow the strap's second end 20 to be guided between the guide walls 26, 28, through the opening 32, and positioned adjacent the body surface 30, as shown in FIG. 3. The guide walls 26, 28 form a guide avenue with the base portion 29 of the body 10.

As shown in FIGS. 4 and 5, the strap hook 18 and the body hook 22 may be positioned to engage respective opposite edges 34, 36 of a stringer 38. The support attachment may be securely mounted on the stringer 38 by passing a sufficient portion of the strap 12 through the opening 32, placing the strap 12 into tension and drawing the engaging elements of the strap surface 14 into engaging juxtaposition with the engaging elements of the body surface 30. The body 10, particularly the central portion 24 and the guidewall members 26, 28, are formed of a sufficiently rigid material to provide a supporting span across the channel 40 of the stringer 38. At the central portion 24 of the body 10 is located a supporting means 42 which may include an interally-threaded bore 44. Devices or members to be supported on a stringer 38 may be attached to the supporting means 42 which will, in turn, support the devices or members on the stringer 38.

It is to be appreciated that the described and illustrated embodiment of the invention represents the current best mode for carrying out the invention. Obviously, certain changes could be made to the invention without departing from its overall spirit and scope. The above description is not intended to limit the scope of allowable patent protection due the applicant or his assignees. The scope of such protection is to be defined solely by the following claim, wherein such claim is to be interpreted in accordance with the well-established doctrines of patent claim interpretation, including the doctrine of equivalents.

What is claimed is:

1. A mounting assembly attachable to a stringer of a type having spaced apart flanges each with edges, comprising:
   a strap having a first end portion including a hook engageable over the edge of a first flange of the stringer, said strap being of a length to extend laterally across the stringer, an inner surface, and a second end portion;
   a mounting member having a base positionable against the stringer, said base including a hook engageable on the edge of the second flange of the stringer, a guide avenue for the strap, and an outer surface adjacent its hook;
   a plurality of upstanding hook elements on one of said inner surface of the strap and said outer surface of the mounting member, and a plurality of upstanding loop elements on the other of said surfaces; and
   said strap being of sufficient length, and said hook and loop elements being so positioned to permit the strap to be hooked onto a first flange of the stringer, the mounting member to be hooked onto a second flange of the stringer, the strap to be placed within the guide avenue of the mounting member and then pulled upon, to put the strap in tension, and then the second end portion of the strap to be drawn against the outer surface of the mounting member, to bring the hook and loop elements into connecting engagement.

2. The mounting assembly of claim 1, wherein said strap hook is made of a thermoplastic material and said first end portion of said strap is integrally molded therein.

3. The mounting assembly of claim 2, wherein said strap hook includes a rigid base portion, a lip spaced from and substantially parallel to said base portion, and an interconnecting portion therebetween, and wherein said strap extends outwardly from the base portion in a substantially coplanar direction.

4. The mounting assembly of claim 1, wherein said base hook includes a brace portion extending substantially coplanar from said base, a lip spaced from and substantially parallel to an outward edge of said brace portion, and an interconnecting portion therebetween, and wherein said outer surface of said mounting member is on said brace portion.

5. The mounting assembly of claim 4, wherein said outer surface is also on said interconnecting portion.

6. The mounting assembly of claim 1, wherein said guide avenue includes sidewalls forming a channel with the mounting member base.

7. A mounting attachment for structural stringers, comprising:
   a strap having a hook portion at ne end shaped for engagement with an edge of a stringer, and a normally free end, said strap including a surface having a plurality of engaging elements upstanding therefrom, said surface extending substantially along the entire length of said strap; and
   a body having a hook portion shaped for engagement with another edge of said stringer, said body further including a central portion and a pair of parallel spaced-apart guidewall portions extending outwardly away from one side of said central portion, a surface portion extending outwardly away from an opposite side of said central portion, said surface portion facing away from said stringer and having a plurality of mating engaging elements upstanding therefrom, an opening extending transversely through said central portion, said opening providing a pathway for guiding said strap's free end from between said guidewall portions to said surface portion, and said central portion including a supporting means for securing attaching devices to said body;

said engaging elements on one of said strap surfaces and said body surface portion being upstanding hook elements and the other being upstanding loop elements;

wherein respective hook portions of said strap and said body may be engaged on opposite edges of stinger, said strap's normally free end may be inserted through said opening, and said strap may be put into tension and then drawn toward said surface portion such that said engaging elements of said strap and said surface portion are brought into engaging juxtaposition.

* * * * *

UNITED STATES PATENT AND TRADEMARK OFFICE
CERTIFICATE OF CORRECTION

PATENT NO. : 4,896,851

DATED : January 30, 1990

INVENTOR(S) : Lawrence M. Shaull

It is certified that error appears in the above-identified patent and that said Letters Patent is hereby corrected as shown below:

Claim 7, column 4, line 58, "ne" should be -- one --.

Claim 7, column 6, line 6, after "edges of", insert -- a --.

Signed and Sealed this

Twenty-second Day of October, 1991

Attest:

HARRY F. MANBECK, JR.

*Attesting Officer*  *Commissioner of Patents and Trademarks*